United States Patent [19]

Gregory et al.

[11] Patent Number: 5,254,675
[45] Date of Patent: Oct. 19, 1993

[54] ANIONIC DISAZO DYES

[75] Inventors: Peter Gregory, Bolton; Prahalad M. Mistry, Ashton-under-Lyne; David Greenwood, Oldham, all of England

[73] Assignee: Imperial Chemical Industries PLC, London, England

[21] Appl. No.: 816,677

[22] Filed: Jan. 3, 1992

[30] Foreign Application Priority Data

Jan. 8, 1991 [GB] United Kingdom ............ 9100302

[51] Int. Cl.$^5$ .................... C09B 31/08; C09B 67/22; C09D 11/02
[52] U.S. Cl. ........................................ 534/829; 8/641
[58] Field of Search ............ 534/829, 834, 836, 837; 8/641

[56] References Cited

U.S. PATENT DOCUMENTS

| | | | |
|---|---|---|---|
| 4,557,761 | 12/1985 | Kobayashi et al. | 534/829 X |
| 4,752,337 | 6/1988 | Kunde | 534/829 X |
| 4,841,037 | 6/1989 | Ohta et al. | 534/832 X |
| 4,963,189 | 10/1990 | Hindagolla et al. | 534/824 X |
| 5,062,893 | 11/1991 | Adamic et al. | 534/837 X |

FOREIGN PATENT DOCUMENTS

| | | | |
|---|---|---|---|
| 0356080 | 2/1990 | European Pat. Off. | 534/829 |
| 60-108740 | 6/1985 | Japan | 534/829 |

OTHER PUBLICATIONS

Greenwood et al., Chemical Abstracts, vol. 103, #61303z (1990).

*Primary Examiner*—Floyd D. Higel
*Attorney, Agent, or Firm*—Cushman, Darby & Cushman

[57] ABSTRACT

A compound which, in the free acid form, is of the Formula (1):

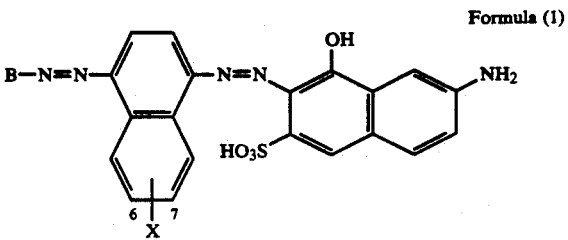

wherein
B is 3- or 4-carboxyphenyl; and
X is H.

The compound is useful in the preparation of inks for ink jet printing of substrates such as paper, on which it gives highly water fast prints which show little bronzing.

5 Claims, No Drawings

ANIONIC DISAZO DYES

This invention relates to anionic dyes and inks, and particularly black anionic dyes which have differential water-solubility dependent upon pH.

According to the first aspect of the present invention there is provided a compound which, in the free acid form, is of the Formula (1):

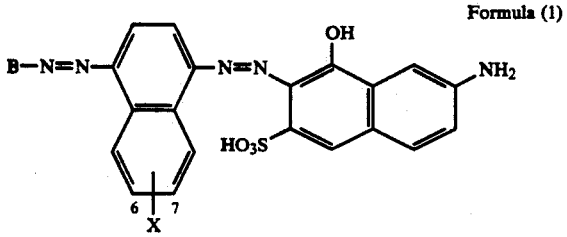

Formula (1)

wherein
B is 3- or 4-carboxyphenyl; and
X is H.

It is preferred that B is 3-carboxyphenyl because this compound shows a particularly deep black shade and negligable bronzing when printed on plain paper.

The compound of the present invention is useful as a colorant either alone or in admixture with another compound to form a composition. A preferred composition comprises a first compound according to the first aspect of the present invention and a second compound of Formula (1) wherein B is 3- or 4- carboxyphenyl and X is sulpho at the 6- or 7- position. It is preferred that the first and second compound are present in a weight-to-weight ratio of 95:5 to 5:95, more preferably 80:20 to 20:80, especially 40:60 to 60:40.

The preferred compounds of Formula (1) and compositions, hereinafter collectively referred to as dyes, are in the form of a salt with a cation or mixture of cations, for example in the form of an alkali metal, ammonium or optionally substituted lower alkyl ammonium salt. The cation is preferably ammonium or optionally substituted lower (i.e., $C_{1-4}$-) alkyl ammonium, although when B is 3-carboxyphenyl the cation can be an alkali metal such as sodium. A preferred optional substituent which may be present on the optional substituted lower alkyl ammonium cations is a hydroxy group. Especially preferred cations are ammonium, mono-, di-, tri- and tetra-($C_{1-4}$-alkyl)ammonium and mono-, di-, tri- and tetra-(hydroxy-$C_{1-4}$- alkyl)ammonium. It is, however, most preferred that the dyes are in the form of an ammonium (i.e., $NH_4^+$) or mixed ammonium and alkali metal (especially sodium) salt.

Examples of optionally substituted lower alkylammonium cations include methylammonium, ethylammonium, dimethylammonium, diethylammonium, trimethyammonium, triethylammonium, tetramethylammonium and tri(2-hydroxyethyl)ammonium.

The compounds according to the first aspect of the present invention can be made by diazotising 3- or 4- carboxyaniline and coupling with alpha-naphthylamine to give a monoazo compound, diazotising the resultant monoazo compound and coupling with gamma acid.

The dyes of the present invention can be converted into their ammonium or optionally substituted lower alkylammonium salt by dissolving the dye in the form of a salt with an alkali metal, acidifying with a mineral acid, adjusting the solution to pH 9-9.5 with ammonia or an optionally substituted lower alkylamine and removing alkali metal chloride ions by dialysis.

The preferred dyes according to the invention are intended for use in ink jet printing.

The dyes of the present invention are useful colorants for inks, and are notable for the good water fastness and the deep black shades with high optical density and minimal "bronzing" of their prints on plain paper. The dyes also have good solubility in aqueous media at a pH which causes little or no corrosion of the mechanism of ink jet printing devices.

A suitable ink comprises a mixture of one or more compounds according to the first aspect of the present invention or a composition as hereinbefore described and a liquid medium, preferably an aqueous medium, for example an ink analogous to those described in U.S. Pat. No. 4,963,189. It is preferred that the compound, compounds or composition are completely dissolved in the liquid medium to form a solution.

The ink preferably contains from 0.5% to 20%, more preferably from 0.5% to 15%, and especially from 1% to 5%, by weight of the dye based on the total weight of the ink.

The liquid medium is preferably water or a mixture comprising water and a water-soluble organic solvent, preferably respectively in a weight-to-weight ratio of 99:1 to 1:99, more preferably 95:1 to 50:50, especially 90:10 to 60:40.

The water-soluble organic solvent is preferably a $C_1$–$C_4$-alkanol such as methanol, ethanol, n-propanol, isopropanol, n-butanol, sec-butanol, tert-butanol or iso-butanol; an amide such as dimethylformamide or dimethylacetamide; a ketone or ketone alcohol such as acetone or diacetone alcohol; an ether such as tetrahydrofuran or dioxane; a polyalkylene glycol such as polyethylene glycol or polypropylene glycol; an alkylene glycol or thioglycol containing a $C_2$–$C_6$ alkylene group such as ethylene glycol, propylene glycol, butylene glycol or triethylene glycol; a thiodiglycol, hexylene glycol, or diethylene glycol; a polyol such as glycerol or 1,2,6-hexanetriol; a lower alkyl ether of a polyhydric alcohol such as 2-methoxyethanol, 2-(2-methoxyethoxy)ethanol, 2-(2-ethoxyethoxy)- ethanol, 2-[2-(2-methoxyethoxy)ethoxylethanol, 2-[2-(2-ethoxyethoxy)ethoxy]-ethanol or N-methylpyrrolidone; or a mixture containing two or more of the aforementioned water-soluble organic solvents.

The preferred water-soluble organic solvent is an alkylene glycol or lower alkyl ether of a polyhydric alcohol such as ethylene glycol, diethylene glycol, triethylene glycol or 2-methoxy-2-ethoxy-2-ethoxyethanol; or a polyethylene glycol with a molecular weight of up to 500. A preferred specific solvent mixtures is a binary mixture of water and diethylene glycol in a weight-to-weight ratio as mentioned above.

It is preferred that the ink of the present invention contains a penetrant which assists permeation of the compound into a substrate such as paper and optionally up to 0.5% by weight of sodium borate.

A further aspect of the present invention provides a process for printing a substrate with an ink using an ink jet printer, characterised in that the ink contains at least one compound according to the first aspect of the present invention or a composition as hereinbefore described.

A suitable process for the application of an ink according to the invention to a substrate, for example paper, comprises forming the ink into small droplets by ejection from a reservoir through a small orifice so that the droplets of ink are directed at the substrate; this process is commonly referred to as ink jet printing, and the preferred processes for application of the inks hereinbefore defined are piezoelectric ink jet printing, and in particular thermal ink jet printing. In thermal ink jet printing programmed pulses of heat are applied to the ink adjacent to the orifice during relative movement between the substrate and the reservoir.

The preferred substrate is a cellulosic substrate, especially paper. The type of ink jet printer is not believed to be critical; however, it is preferably a thermal ink jet printer.

The preferred ink used in the process is as hereinbefore described.

According to a still further aspect of the present invention there is provided paper printed with a compound, composition or ink according to the invention.

The invention is further illustrated by the following Examples in which all parts and percentages are by weight unless otherwise indicated.

PREPARATION OF DYE A 1-hydroxy-2-(4-[3-carboxyphenyl-azo]-7-sulphonaphth-1-ylazo)-3-sulpho-7-aminonaphthalene hereinafter referred to as Dye A, was prepared as follows

Stage 1

3-Aminobenzoic acid (13.7 g, 0.1M) was stirred in water (150 ml) at room temperature and 2N NAOH added to form a solution at pH 8.0. 2N $NANO_2$ solution (50 ml) was added and the mixture stirred to homogenise. The solution was added gradually to a mixture of ice/water (150 ml) and 35% HCl (50 ml) at 5° C. and the resulting suspension stirred for 2 hours at 50° C. Sulphamic acid solution (10%) was added in order to remove excess nitrous acid and give a diazo solution.

1,7-Cleves acid (22.3 g, 0.1M) was dissolved in a solution of water (150 ml) and 32% NAOH solution at pH 8.5, and the solution cooled to 10° C. To this solution was added the above diazo solution and the pH raised to 5.5 by the addition of $Na_2CO_3$ solution (20%) to give an orange suspension which was stirred for 16 hours at 10° C., before raising the pH to 7.0 by addition of 2N NAOH solution and heating at 70° C. 25% NaCl aqueous (w/v) was added and the precipitated dye collected by filtration and washed with NaCl aqueous solution (25%, 200 ml) to give a paste.

Stage 2

The paste from Stage 1 (0.1M) was dissolved in water (100 ml) and 2N NAOH solution at pH 9.0. 2N $NANO_2$ solution (50 ml) was added and the mixture stirred for 3 minutes, then added gradually to a mixture of ice/water (150 ml) and 36% HCl (50 ml) at 5° C. using rapid agitation. The resulting suspension was stirred for 1 hour at 5° C. Sulphamic acid solution (10%) was added in order to remove excess nitrous acid and gave a diazo suspension. Gamma acid (26.5 g, 0.1M) was dissolved in water (150 ml) and 2N NAOH solution at pH 9.0. $Na_2CO_3$ (10 g) was added and the solution cooled to 0°–10° C. To this was added the above diazo suspension, maintaining the pH at 8.0 to 9.0 with 20% $Na_2CO_3$ solution. The solution was stirred for 1 hour at 0°–10° C. and the pH adjusted to 7.0 by the addition of hydrochloric acid. The solution was heated to 70° C., NaCl solution (10% w/v) was added and the precipitated dye collected by filtration and washed with 10% NaCl solution (100 ml) to give the trisodium salt of Dye A.

EXAMPLE 1

Preparation of 1-hydroxy-2-(4-[3-carboxyphenyl-azol-naphth-1-ylazo)-3-sulpho-7-aminonaphthalene, disodium salt

Stage 1

3-Aminobenzoic acid (13.7 g, 0.1M) was diazotised by the method described in the preparation of Dye A, Stage 1, to give a diazo solution.

1-Naphthylamine (14.3 g, 0.1M) was dissolved in water (300 ml) and 36% HCl (15 ml) at 70° C. and cooled to room temperature. The resulting suspension was added to the above diazo solution at 10° C. and the pH adjusted to 4.5 by the addition of sodium acetate. The mixture was stirred for 18 hours and the product collected by filtration and washed with water (100 ml) to give a paste.

Stage 2

The paste from Stage 1 (0.1M) was diazotised and coupled with gamma acid by a method analogous to that described in the preparation of Dye A, Stage 2, to give the disodium salt of 1-hydroxy-2-(4-[3-carboxyphenylazo]-naphth-1-ylazo)-3 -sulpho-7-amino-naphthalene.

Examples of specific inks are:

| Ink | Dye from Stage No. (parts) | Liquid medium and other components (parts) |
| --- | --- | --- |
| 1 | 2 (2.5) | Water (60) Ethylene glycol (40) |
| 2 | 2 (4.0) | Water (85) Diethylene glycol (15) |
| 3 | 2 (5.0) | Water (90) Diethylene glycol (10) |
| 4 | 2 (3.0) | Water (65) Glycerol (25) Triethanolamine (10) |
| 5 | 2 (2.0) Dye A (2.0) | Water (80) Ethylene glycol (15) Polyethylene glycol (MW 200) (5) |
| 6 | 2 (2.2) | Water (89.8) 2-Pyrrolidone (10) Sodium Borate (0.2) |

When each of the above inks is printed onto plain paper using a piezo or thermal ink jet printing machine, the printed image obtained has high resistance to water and gives a deep black shade showing little or no bronzing.

EXAMPLE 2

Preparation of the mixed Ammonium-sodium salt of 1-hydroxy-2-(4-[4-carboxyphenylazo]-naphth-1-ylazo)-3-sulpho-7-aminonaphthalene The method of Example 1, Stages 1 and 2 was followed except that in place of the 13.7 g of 3-aminobenzoic acid used in Stage 1 there was used 13.7 g of 4-aminobenzoic acid. The product, 1-hydroxy-2-(4-[4-carboxyphenylazol-naphth-1-ylazo) -3-sulpho-7-aminonaphthalene, was stirred in water (400 ml) at pH 8–9 until a complete solution was obtained. The solution was then slowly added to a mixture of concentrated hydrochloric acid (45 ml) and water (50 ml) and the suspension stirred for 30 minutes and then filtered to give a paste.

The paste was stirred in water (300 ml) and conc.ammonium hydroxide added to raise the pH to 9-9.5. The solution was then dialysed to remove chloride ions and solvent evaporated to give the mixed ammonium-sodium salt. When made into an ink and printed onto plain paper using a thermal ink jet printing machine, the printed image has a very high resistance to water with deep black shades showing little bronzing.

EXAMPLE 3

The disodium salt of 1-hydroxy-2-(4-[3-carboxyphenylazo]-naphth-1-ylazo)-3-sulpho-7-aminonaphthalene, prepared according to the method of Example 1 was converted to the mixed ammonium-sodium salt by a method analogous to that described in Example 2.

When converted to an ink and printed onto plain paper using a thermal ink jet printing machine the printed image obtained has very high water fastness and a deep black shades showing negligible bronzing.

We claim:

1. A compound which, in the free acid form, is of the Formula:

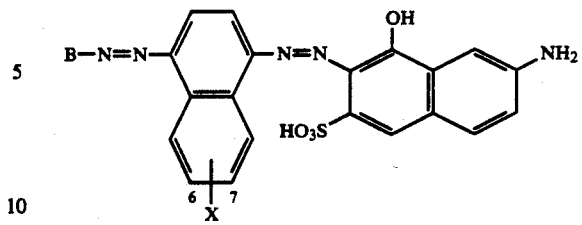

wherein
B is 3- or 4-carboxyphenyl; and
X is H.

2. A compound according to claim 1 wherein B is 3-carboxyphenyl.

3. A compound according to any one of the preceding claims in the form of an ammonium or mixed ammonium and alkali metal salt.

4. A compound according to any one of the preceding claims in the form of an ammonium salt.

5. A composition comprising a first compound defined in claim 1 and a second compound as shown in claim 1, in which B is 3- or 4- carboxyphenyl and X is sulpho at the 6- or 7- position.

* * * * *